L. C. HOPKINS & A. COOKE.
Hand-Car.

No. 159,266. Patented Feb. 2, 1875.

UNITED STATES PATENT OFFICE.

LEWIS C. HOPKINS AND AUGUSTUS COOKE, OF CINCINNATI, OHIO.

IMPROVEMENT IN HAND-CARS.

Specification forming part of Letters Patent No. 159,266, dated February 2, 1875; application filed July 29, 1874.

*To all whom it may concern:*

Be it known that we, LEWIS C. HOPKINS and AUGUSTUS COOKE, both of Cincinnati, Hamilton county, Ohio, have invented, jointly, certain Improvements in Railway-Vehicles, of which the following is a specification:

Our invention relates to an improved car for locomotion on rail or tram-ways, to be driven by the persons riding therein, and is intended to take the place of what is known as the common hand-car, in which the power is applied, through the medium of a crank, by two or more persons.

Our invention consists in constructing a car in which the motion is applied through the medium of a pivoted vibrating or oscillating seat, so that two or more persons seated on opposite sides of the double seat, which we generally prefer to use, may, by a simple motion of the body, propel the car at great speed.

Figure 1:
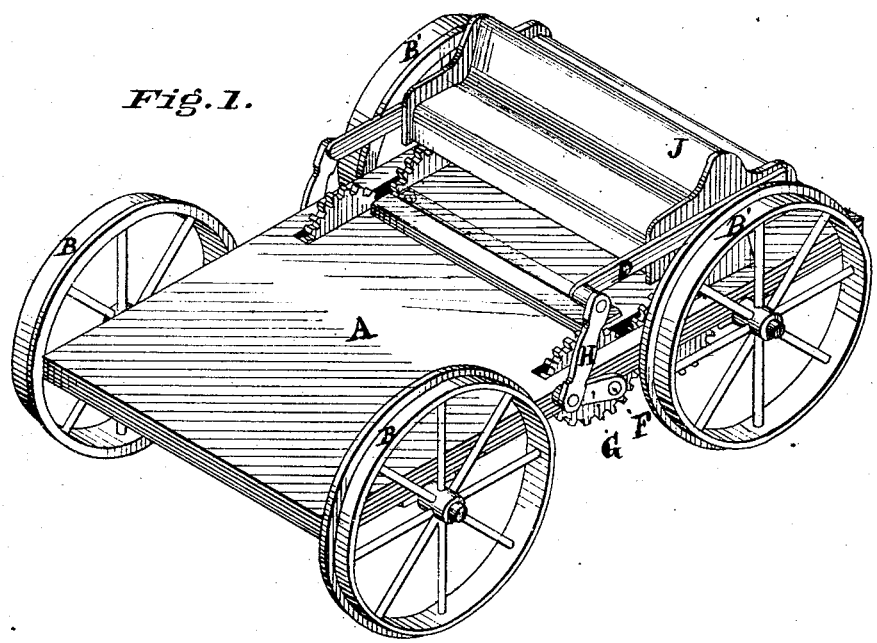
Figure 2:
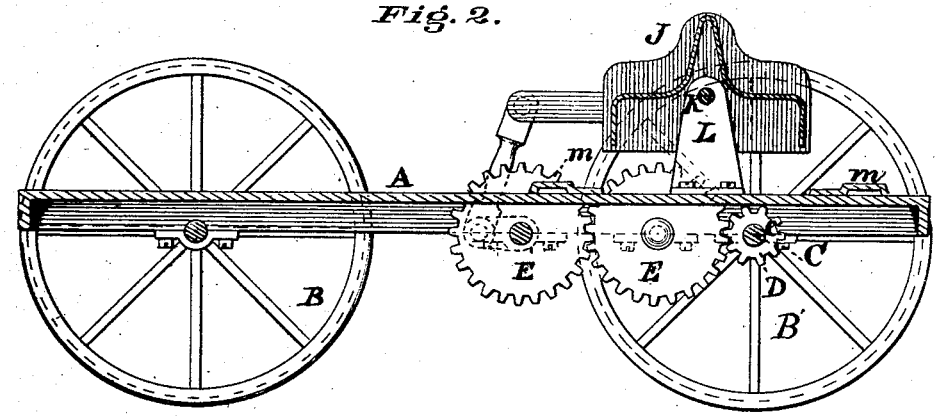

Figure 1 is an elevation of a car embodying the invention. Fig. 2 is a cross-section, showing more clearly the mechanism for transmitting motion to the driving-wheels.

In the drawings, A represents the floor of the car, and B B B' B' the wheels of the same having a flanged tread, and fitted to run upon a rail or tram way. The wheels B' B' are secured to the shaft C, on which is the pinion D, which meshes into the cog-wheel E, which again meshes into the cog-wheel E'. To the outer part of the shaft F, on which the wheel E' is secured, is attached the crank G, to which is connected the crank-shaft H, the upper end of which is connected with the arm I secured to the side of the double seat J. The seat J is pivoted at each end, as seen at K, Fig. 2, upon the side standards L, firmly secured to either side of the car. This seat, being double, allows persons to sit, one or more, on either side, back to back, and vibrate the seat upon the pivot by the simple motion of the body, resting their feet for support against the foot-rests M M. The seat, being thus vibrated, communicates its motion to the drawing-wheels by means of the arm I, crank-shaft H, crank G, and wheels E, E', and D.

If it is desired, there may be a seat similar to J at the other end of the car, and connected in a similar manner with the wheels at that end of the car, so as to make a double pair of drive-wheels. The cog-wheels E and E' may be so managed as to be thrown out of gear when desired, so that in going down grades the seat may remain stationary.

When driving-seats are arranged at each end of the vehicle, this arrangement for throwing the wheels E and E' out of gear will be especially convenient, as then the seats can operate the car alternately, each allowing the other to rest, or when the car comes to an up grade both can be applied. The same principle may be applied to propelling boats, pleasure vehicles, &c. A similar motion may be obtained by adjusting the seat upon rockers instead of upon a pivot; but we prefer the arrangement heretofore described.

We do not claim, broadly, in this application, the combination of any oscillating seat with crank-shaft and driving-wheels, that combination having been shown in the patents heretofore granted us for pleasure vehicles designed for ordinary roadways.

We do claim, however—

The combination of double seat J, connecting-rod H, and the system of cog-wheels E, E', and D, for actuating driving-wheels, substantially as set forth.

L. C. HOPKINS.
AUGUSTUS COOKE.

Witnesses:
JOHN E. HATCH,
WM. S. BATES.